(12) United States Patent
Hou

(10) Patent No.: US 11,932,051 B2
(45) Date of Patent: Mar. 19, 2024

(54) WHEEL AND SCOOTER

(71) Applicant: BEIJING XIAOMI MOBILE SOFTWARE CO., LTD., Beijing (CN)

(72) Inventor: Qinling Hou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 174 days.

(21) Appl. No.: 17/520,244

(22) Filed: Nov. 5, 2021

(65) Prior Publication Data
US 2022/0379659 A1  Dec. 1, 2022

(30) Foreign Application Priority Data
Jun. 1, 2021  (CN) .......................... 202110609102.3

(51) Int. Cl.
| | |
|---|---|
| B60B 27/00 | (2006.01) |
| B60B 27/02 | (2006.01) |
| B62K 3/00 | (2006.01) |
| B62K 3/02 | (2006.01) |
| F16C 33/58 | (2006.01) |
| F16C 33/78 | (2006.01) |

(52) U.S. Cl.
CPC ........ B60B 27/0078 (2013.01); B60B 27/023 (2013.01); B62K 3/002 (2013.01); B62K 3/02 (2013.01); F16C 33/583 (2013.01); F16C 33/782 (2013.01); B60B 2200/47 (2013.01); F16C 2326/02 (2013.01)

(58) Field of Classification Search
CPC ............................ B60B 27/0078; B60B 19/00
See application file for complete search history.

(56) References Cited

U.S. PATENT DOCUMENTS

| | | | |
|---|---|---|---|
| 5,419,619 A | 5/1995 | Lew | |
| 8,998,224 B2 * | 4/2015 | Ngai | B62K 3/002 |
| | | | 280/87.041 |
| 9,573,417 B2 * | 2/2017 | Wang | A63C 17/223 |
| 2013/0154220 A1* | 6/2013 | Stroppiana | B62K 3/002 |
| | | | 280/87.041 |

FOREIGN PATENT DOCUMENTS

| | | | |
|---|---|---|---|
| CN | 205468303 U | 8/2016 | |
| CN | 106114726 A * | 11/2016 | ............ B60B 19/00 |
| CN | 207015153 U * | 2/2018 | |

(Continued)

OTHER PUBLICATIONS

European Patent Application No. 21206844.9 extended Search and Opinion dated May 13, 2022, 8 pages.

(Continued)

*Primary Examiner* — Kevin Hurley
*Assistant Examiner* — Hosam Shabara
(74) *Attorney, Agent, or Firm* — COZEN O'CONNOR

(57) ABSTRACT

A wheel is assembled and fitted with a frame of the scooter, and includes a bearing support, a hub, at least one bearing and a hollow area. The bearing support includes an inner surface facing towards a rotation center of the wheel. Each bearing includes an outer ring and an inner ring, the outer ring is fixedly connected to the hub, and the inner ring and the frame are fixedly connected to the bearing support, respectively. The hollow area is surrounded by the inner surface.

16 Claims, 2 Drawing Sheets

(56) References Cited

FOREIGN PATENT DOCUMENTS

| | | | |
|---|---|---|---|
| CN | 207015510 U | | 2/2018 |
| CN | 207015153 U | | 12/2018 |
| CN | 208452693 U | | 2/2019 |
| CN | 109552515 A | | 4/2019 |
| CN | 109795600 A | * | 5/2019 |
| CN | 210502098 U | * | 5/2020 |
| CN | 210502098 U | | 5/2020 |
| JP | 2002531315 A | | 9/2002 |
| WO | WO-2019056962 A1 | * | 3/2019 |

OTHER PUBLICATIONS

Japanese Patent Application No. 2021-181192, Office Action dated Oct. 28, 2022, 4 pages.
Japanese Patent Application No. 2021-181192, English translation of Office Action dated Oct. 28, 2022, 4 pages.
Indian Patent Application No. 202144051329, Office Action dated Dec. 14, 2022, 6 pages.

\* cited by examiner

WHEEL AND SCOOTER

CROSS-REFERENCE TO RELATED APPLICATION

This application is based on and claims priority to the Chinese Patent Application No. 202110609102.3 filed on Jun. 1, 2021, the entire content of which is incorporated herein by reference.

TECHNICAL FIELD

The present disclosure relates to a field of wheels, and more particularly, to a wheel and a scooter.

BACKGROUND

A wheel structure of a scooter, a balance bike, a bicycle or other vehicles is designed in various forms, so as to improve the aesthetics and the user experience. In the related art, the wheel structure usually includes a tire, a hub, a spoke, and a central shaft, and various forms of spokes are connected to the hub, so as to obtain an expected appearance effect. However, due to the limitation of the spoke and other basic structures, the wheel in the related art has the problems of a complex structure and a lack of sense of science and technology.

SUMMARY

According to embodiments of a first aspect of the present disclosure, a wheel for a scooter is provided, and is assembled and fitted with a frame of the scooter. The wheel includes a bearing support, a hub, at least one bearing and a hollow area. The bearing support includes an inner surface facing towards a rotation center of the wheel. Each bearing includes an outer ring and an inner ring, the outer ring is fixedly connected to the hub, and the inner ring and the frame are fixedly connected to the bearing support, respectively. The hollow area is surrounded by the inner surface.

According to embodiments of a second aspect of the present disclosure, a scooter is provided. The scooter includes a main body, a frame connected to the main body and a wheel coupled to the frame. The wheel includes a bearing support, a hub, at least one bearing and a hollow area. The bearing support includes an inner surface facing towards a rotation center of the wheel. Each bearing includes an outer ring and an inner ring, the outer ring is fixedly connected to the hub, and the inner ring and the frame are fixedly connected to the bearing support, respectively. The hollow area is surrounded by the inner surface. The bearing support is fixedly connected to the frame.

It should be understood that the above general description and the following detailed description are only exemplary and explanatory, and do not limit the present disclosure.

BRIEF DESCRIPTION OF THE DRAWINGS

The accompanying drawings incorporated into the specification and forming part of the specification, illustrate embodiments in accordance with the present disclosure, and are used with the specification to explain the principles of the present disclosure.

DETAILED DESCRIPTION

Exemplary embodiments will be described in detail, and examples of the embodiments will be shown in the accompanying drawings. When the following description relates to the accompanying drawings, the same numbers in different accompanying drawings represent the same or similar elements unless otherwise indicated. The implementations described in the following exemplary embodiments do not represent all implementations consistent with the present disclosure. Instead, they are only examples of devices and methods consistent with some aspects of the present disclosure as detailed in the appended claims.

The present disclosure provides a wheel assembled and fitted with a frame, and the wheel includes a bearing support, a hub and at least one bearing. The bearing includes an outer ring and an inner ring, the outer ring is fixedly connected to the hub, and the inner ring and the frame are fixedly connected to the bearing support, respectively. The bearing support includes an inner surface facing towards a rotation center of the wheel. The inner surface defines a hollow area surrounded by the inner surface.

Since the wheel includes the bearing support, the bearing and the hub, and the outer ring of the bearing is fixedly connected to the hub, the hub can rotate relative to the frame based on a fixed connection between the bearing support and the frame. The inner ring of the bearing is fixedly connected to the bearing support, to realize a support function for the bearing and other structures around the bearing through the bearing support. Since the wheel further includes the hollow area surrounded by the inner surface of the bearing support, the wheel obtains a hollow appearance effect, thus simplifying the wheel structure, and improving the appearance effect and the sense of science and technology of the wheel. Since the wheel structure is simplified, the material used for the wheel and the cost of the wheel are reduced, and the carbon emission is reduced.

In the above embodiment, one, two or more bearings may be provided, which is not limited by the present disclosure. The wheel structure is exemplarily described below by taking an example in which the wheel includes two bearings.

Figure 1:
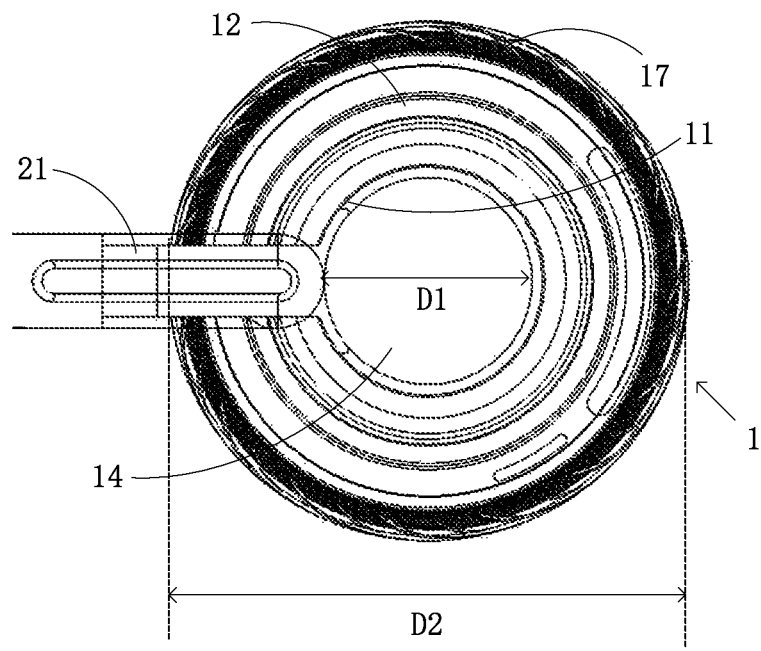
FIG. 1 is a side view of a wheel and a frame fitted with each other according to an exemplary embodiment of the present disclosure.
Figure 2:
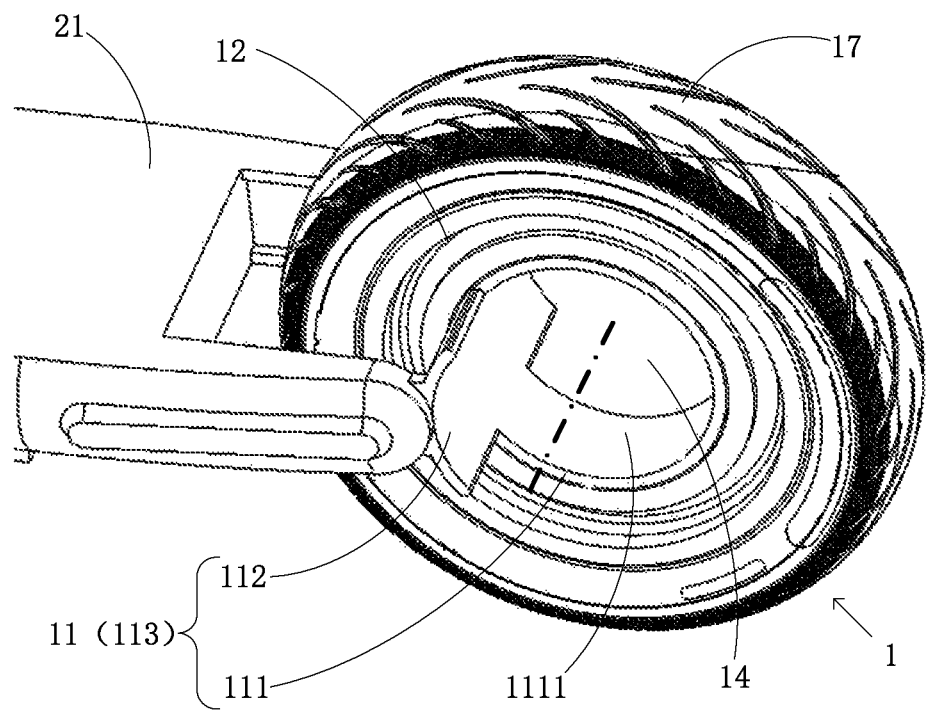
FIG. 2 is a perspective view of a wheel and a frame fitted with each other according to an exemplary embodiment of the present disclosure.
Figure 3:
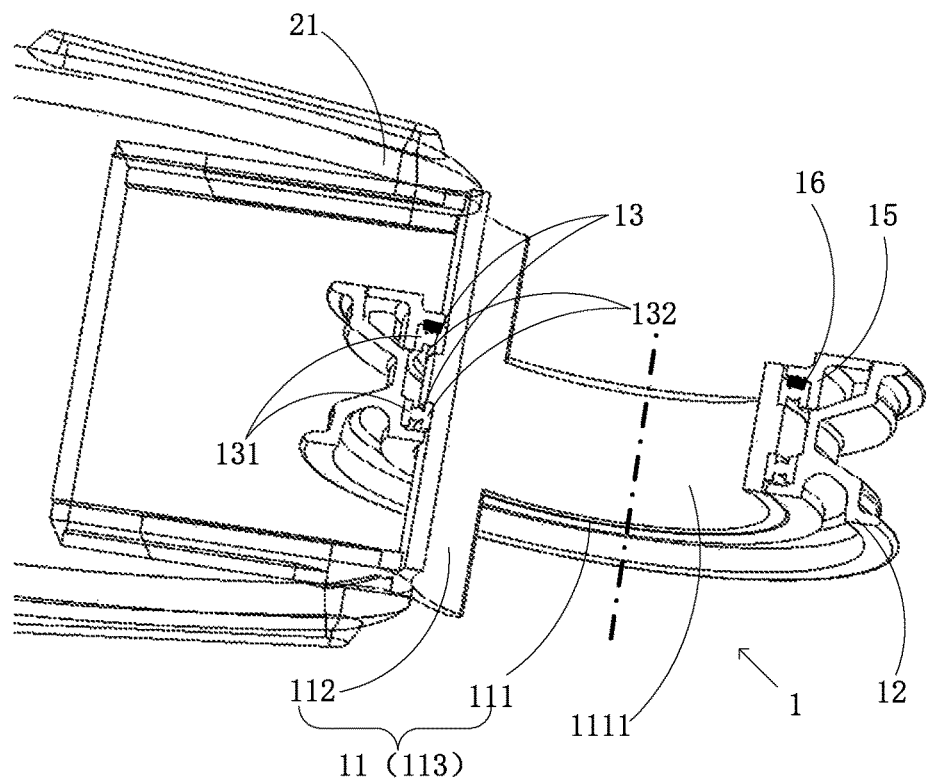
FIG. 3 is a sectional view of a wheel and a frame fitted with each other according to an exemplary embodiment of the present disclosure.

FIG. 1 is a side view of the wheel and the frame fitted with each other in an exemplary embodiment of the present disclosure. FIG. 2 is a perspective view of the wheel and the frame fitted with each other in an exemplary embodiment of the present disclosure. FIG. 3 is a sectional view of the wheel and the frame fitted with each other in an exemplary embodiment of the present disclosure. As shown in FIG. 1, FIG. 2 and FIG. 3, a one-dot chain line in FIG. 2 and FIG. 3 represents a rotation center axis of a wheel 1. The wheel 1 is assembled and fitted with the frame 21. The wheel 1 includes a bearing support 11, a hub 12 and two bearings 13. Each bearing 13 includes an outer ring 131 and an inner ring 132, the outer ring 131 is fixedly connected to the hub 12, and the inner ring 132 and the frame 21 are fixedly connected to the bearing support 11, respectively. The bearing support 11 includes an inner surface 1111 facing towards a rotation center of the wheel 1. Inner surface 1111 defines a hollow area 14 surrounded by the inner surface 1111.

In some embodiments, a section of the hollow area 14 perpendicular to an axial direction of the wheel 1 has a circle shape, a polygon shape or other irregular shapes, which is not limited by the present disclosure. When the section of the hollow area 14 perpendicular to the axial direction of the wheel 1 has the circle shape, the overall aesthetics and the sense of science and technology of the wheel 1 can be improved. As shown in FIG. 1, a characteristic dimension D1 of the hollow area can be greater than or equal to one-third of a contour diameter D2 of the wheel 1, and less than or equal to two-thirds of the contour diameter D2 of the wheel 1, so as to obtain a great appearance effect of a hollow wheel without affecting a structural arrangement of the wheel 1. Or, the contour diameter D2 of the wheel 1 may also be another multiple of the characteristic dimension D1 of the hollow area, which is not limited by the present disclosure.

The characteristic dimension D1 of the hollow area can refer to a characteristic dimension that can reflect an overall shape of the hollow area. For example, when the hollow area has the circle shape, the characteristic dimension D1 of the hollow area can be a diameter of the circle. When the hollow area has the rectangle shape, the characteristic dimension D1 of the hollow area can be a diagonal length of the rectangle.

Since two bearings 13 are provided for the wheel 1, the overall structural strength and the rotation stability of the wheel 1 are improved. Since the bearing support 11 is fixedly connected to the frame 21, and the outer rings 131 of the two bearings 13 are fixedly connected to the hub 12, respectively, the hub 12 can rotate relative to the frame 21. The inner rings 132 of the two bearings 13 are fixedly connected to the bearing support 11, respectively, so as to support the bearing 13 and other structures around the bearing 13 through the bearing support 11, thus ensuring the overall structural strength of the wheel 1. Since the wheel 1 further includes the hollow area 14 surrounded by the inner surface 1111 of the bearing support 11, the wheel 1 obtains a hollow appearance effect, thus simplifying the structure of the wheel 1, and improving the appearance effect and the sense of science and technology of the wheel 1.

It should be noted that the inner ring 132 of the bearing 13 can be fitted over the bearing support 11, and a fixed connection can be realized by interference fit, clamping, threaded connection, welding, etc. The hub 12 can be fitted over the outer ring 131 of the bearing 13, and a fixed connection can be realized by interference fit, clamping, threaded connection, welding, etc.

In some embodiments, the bearing support 11 may be a structural member formed by one support body 113, or the bearing support 11 may also be a structural assembly formed by two or more support bodies 113 assembled and fitted with each other, which is not limited by the present disclosure.

When the bearing support 11 includes one support body 113, as shown in FIG. 2 and FIG. 3, the bearing support 11 may include a supporting body 111 and a connecting structure 112 connected to the supporting body 111, the bearing 13 is fitted with the supporting body 111, and the frame 21 is fitted with the connecting structure 112. A support function for the structure of the wheel 1 is realized through the fit of the supporting body 111 and the bearing 13, and a fixed connection with the frame 21 is realized through the connecting structure 112, thus avoiding the structural and functional interferences between the supporting body 111 and the connecting structure 112 during assembling and use, and improving the reliability of the wheel 1.

One, two or more connecting structures 112 may be provided, which is not limited by the present disclosure. In some embodiments, as shown in FIG. 2 and FIG. 3, the bearing support 11 may include two connecting structures 112 arranged on two opposite sides of the supporting body 111, respectively, so as to assemble the wheel 1 with the frame 21 through the fixed connection between the connecting structures 112 located on the two sides of the supporting body 111 and the frame 21, thus improving the stability of the use of the wheel 1.

Figure 4:
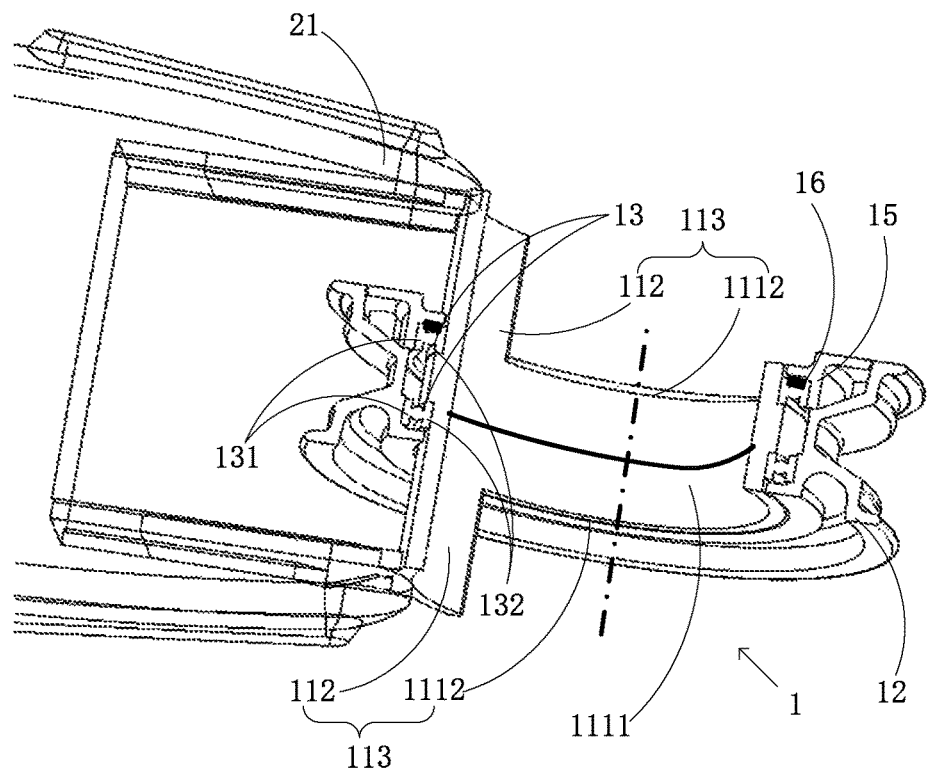
FIG. 4 is a sectional view of a wheel and a frame fitted with each other according to another exemplary embodiment of the present disclosure.

When the bearing support 11 is the structural assembly formed by two or more support bodies 113 assembled and fitted with each other, as shown in FIG. 4, the two or more support bodies 113 are assembled and fitted to form the bearing support 11. Partial structures of the two or more support bodies 113 are assembled to form the supporting body 111, and at least one support body 113 includes the connecting structure 112. When the bearing 13 is fitted with a plurality of support bodies 113, it is convenient to adjust and calibrate a position of the bearing 13 when assembling the plurality of support bodies 113, thus improving the mounting accuracy of the bearing 13. For example, the bearing support 11 includes two support bodies 113 and two bearings 13. When the two support bodies 113 are assembled and fitted, adjacent main structures 1112 at an inner side of the two support bodies 113 are spliced into the supporting body 111, one bearing 13 is assembled on each support body 113, and an outer side of the main structure 1112 of each support body 113 is provided with the connecting structure 112. The positions of the two bearings 13 can be adjusted and calibrated when assembling the plurality of support bodies 113, thus improving the mounting accuracy of the bearing 13.

It should be noted that a width of the supporting body 111 in a axial direction of the wheel 1 can match with a width of the hub 12 in the axial direction of the wheel 1, the inner surface 1111 of the bearing support 11 can refer to an inner surface of the supporting body 111, and the hollow area 14 of the wheel 1 can be surrounded by the inner surface of the supporting body 111, so that a width of the hollow area 14 in the axial direction of the wheel 1 matches with the width of the hub 12 in the axial direction of the wheel 1, thus improving the overall aesthetics of the wheel 1.

In some embodiments, at least a part of the connecting structure 112 protrudes beyond the hub 12 in the axial direction of the wheel 1, so as to facilitate the assembling and fitting of the frame 21 and the connecting structure 112 and also to avoid the structural interference between the frame 21 and the wheel 1.

It should be noted that the supporting body 111 and the connecting structure 112 can be integrally formed, and the connecting structure 112 can also be assembled to the supporting body 111 by means of threaded connection, clamping, welding, etc. The present disclosure is not limited to this.

In some embodiments, as shown in FIGS. 1 to 4, the one-dot chain line in these figures represents the rotation center axis of the wheel 1. The wheel 1 may include at least two bearings 13, the bearing support 11 includes a left edge and a right edge arranged along the axial direction of the wheel 1, the inner ring 132 of at least one of the at least two bearings 13 is fitted with the left edge, and the inner ring 132 of at least another one of the at least two bearings 13 is fitted with the right edge, so as to improve the rotation stability of the wheel 1 by increasing a number of the bearings 13 and optimizing distribution positions of the bearings 13.

In other embodiments, the wheel 1 may also include one bearing 13 which matches with a width of the bearing support 11 in the axial direction of the wheel 1, thus simplifying the structure and the cost of the wheel 1.

It should be noted that the wheel 1 may include one or more bearings 13, and the bearing support 11 may include one or more support bodies 113, which is not limited by the present disclosure. In some embodiments, when the bearing support 11 includes one support body 113, the wheel 1 may include one or more bearings 13. In other embodiments, when the bearing support 11 includes a plurality of support bodies 113, the wheel 1 may include one or more bearings 13. In still other embodiments, a number of the bearings 13 of the wheel 1 can match with a number of the support bodies 113 of the bearing support 11, and the bearings 13 can be correspondingly fitted with the support bodies 113 one to one, so as to adjust and calibrate the positions of the bearings 13 when assembling a plurality of support bodies 113, thus improving the mounting accuracy of the bearings 13.

In some embodiments, the wheel 1 further includes at least one bearing end cover 15. The bearing end cover 15 is fixedly connected to the hub 12, and hermetically fitted with a side surface of the bearing 13. The bearing end cover 15 can be fitted with the hub 12 to limit and seal the bearing 13, thus improving the dust-proof effect and the water-proof effect of the bearing 13. For example, as shown in FIG. 3 and FIG. 4, the wheel 1 includes two bearings 13 and one bearing end cover 15. A side surface of one bearing 13 of the two bearings 13 can be limited and sealed through the structure of the hub 12, and a side surface of the other bearing 13 of the two bearings 13 can be limited and sealed through the bearing end cover 15, so as to simplify the assembling of the wheel 1 and improve the dust-proof effect and the water-proof effect of the bearing 13.

In the above embodiment, the wheel 1 may further include a sealing member 16 arranged between the bearing end cover 15 and the bearing 13, and the sealing member 16 is hermetically fitted with the bearing end cover 15 and the side surface of the bearing 13. Since the sealing member 16 seals between the bearing end cover 15 and the bearing 13, the sealing effect on the side surface of the bearing 13 is improved.

In some embodiments, the wheel 1 further includes a tire 17 assembled to an external side of the hub 12, so that the wheel 1 obtains a damping effect.

It should be noted that the fixed connection between the bearing support 11 and the frame 21, between two adjacent support bodies 113, and between the bearing end cover 15 and the hub 12 can be realized by threaded connection, clamping, welding, etc., which is not limited by the present disclosure.

The present disclosure further provided a scooter including a main body, a frame 21 connected to the main body, and the above wheel 1, and the bearing support 11 is fixedly connected to the frame 21.

In the scooter according to embodiments of the present disclosure, the wheel 1 includes the bearing support 11, the bearing 13 and the hub 12, and the outer ring 131 of the bearing 13 is fixedly connected to the hub 12, so that the hub 12 can rotate relative to the frame 21 based on the fixed connection between the bearing support 11 and the frame 21. The inner ring 132 of the bearing 13 is fixedly connected to the bearing support 11, so as to realize the support function for the bearing 13 and other structures around the bearing 13 through the bearing support 11. Since the wheel 1 further includes the hollow area 14 surrounded by the inner surface 1111 of the bearing support 11, the wheel 1 obtains the hollow appearance effect, simplifying the structure of the wheel 1, and improving the appearance effect and the sense of science and technology of the wheel 1 and the scooter using the above wheel 1.

Other implementations of the present disclosure will be apparent to those skilled in the art from consideration of the specification and practice of the present disclosure. The present disclosure is intended to cover any change, use or adaptation of the present disclosure, which complies with the general principle of the present disclosure and includes common knowledge or conventional technical means in the art that are not disclosed herein. The specification and embodiments are considered to be merely exemplary, and the true scope and spirit of the present disclosure are indicated by the following claims.

It should be understood that the present disclosure is not limited to the specific structures described above and shown in the accompanying drawings, and various modifications and changes may be made without departing from the scope of the present disclosure. The scope of the present disclosure is limited only by the appended claims.

What is claimed is:

1. A wheel for a scooter, assembled and fitted with a frame of the scooter, and the wheel comprising:
    a bearing support comprising an inner surface facing towards a rotation center of the wheel, the inner surface defining a hollow area surrounded by the inner surface;
    a hub; and
    at least one bearing, the at least one bearing comprising an outer ring and an inner ring, the outer ring being fixedly connected to the hub, and the inner ring and the frame being fixedly connected to the bearing support, respectively; and
    a bearing-end cover fixedly connected to an outer side of the hub and being hermetically fitted with a side surface of the bearing,
    wherein the wheel further comprises a sealing member arranged between the bearing end cover and the bearing, and the sealing member is hermetically fitted with the bearing end cover and the side surface of the bearing.

2. The wheel according to claim 1, wherein the bearing support comprises a supporting body and at least one connecting structure connected to the supporting body, the bearing is fitted with the supporting body, and the frame is fitted with the connecting structure.

3. The wheel according to claim 2, wherein at least a part of the connecting structure protrudes beyond the hub.

4. The wheel according to claim 2, wherein the bearing support comprises two connecting structures arranged on two opposite sides of the supporting body respectively.

5. The wheel according to claim 2, wherein a width of the supporting body in a axial direction of the wheel matches with a width of the hub in the axial direction of the wheel.

6. The wheel according to claim 1, wherein the bearing support comprises at least two support bodies, and the at least two support bodies are assembled and fitted with each other.

7. The wheel according to claim 1, wherein the wheel comprises at least two bearings, the bearing support comprises a left edge and a right edge arranged along an axial direction of the wheel, the inner ring of at least one of the at least two bearings is fitted with the left edge, and the inner ring of at least another one of the at least two bearings is fitted with the right edge.

8. The wheel according to claim 1, wherein a section of the hollow area perpendicular to an axial direction of the wheel has one of a circle shape and a rectangle shape.

9. A scooter, comprising:
a main body;
a frame connected to the main body; and
a wheel coupled to the frame, the wheel comprising:
a bearing support comprising an inner surface facing towards a rotation center of the wheel;
a hub;
at least one bearing, the at least one bearing comprising an outer ring and an inner ring, the outer ring being fixedly connected to the hub, and the inner ring and the frame being fixedly connected to the bearing support, respectively; and
a hollow area surrounded by the inner surface,
wherein the bearing support is fixedly connected to the frame; and
a bearing end cover fixedly connected to an outer side of the hub, and being with a side surface of the bearing,
wherein the scooter further comprises a sealing member arranged between the bearing end cover and the bearing, and the sealing member is hermetically fitted with the bearing end cover and the side surface of the bearing.

10. The scooter according to claim 9, wherein the bearing support comprises a supporting body and at least one connecting structure connected to the supporting body, the bearing is fitted with the supporting body, and the frame is fitted with the connecting structure.

11. The scooter according to claim 10, wherein at least a part of the connecting structure protrudes beyond the hub.

12. The scooter according to claim 10, wherein the bearing support comprises two connecting structures arranged on two opposite sides of the supporting body respectively.

13. The scooter according to claim 10, wherein a width of the supporting body in a axial direction of the wheel matches with a width of the hub in the axial direction of the wheel.

14. The scooter according to claim 9, wherein the bearing support comprises at least two support bodies, and the at least two support bodies are assembled and fitted with each other.

15. The scooter according to claim 9, wherein the wheel comprises at least two bearings, the bearing support comprises a left edge and a right edge arranged along an axial direction of the wheel, the inner ring of at least one of the at least two bearings is fitted with the left edge, and the inner ring of at least another one of the at least two bearings is fitted with the right edge.

16. The scooter according to claim 9, wherein a section of the hollow area perpendicular to an axial direction of the wheel has one of a circle shape and a rectangle shape.

\* \* \* \* \*